(12) United States Patent
Crawshaw (10) Patent No.: US 6,930,593 B2
(45) Date of Patent: Aug. 16, 2005

(54) LANE TRACKING SYSTEM EMPLOYING REDUNDANT IMAGE SENSING DEVICES

(75) Inventor: Richard D. Crawshaw, San Diego, CA (US)

(73) Assignee: Iteris, Inc., Anaheim, CA (US)

( * ) Notice: Subject to any disclaimer, the term of this patent is extended or adjusted under 35 U.S.C. 154(b) by 154 days.

(21) Appl. No.: 10/373,150

(22) Filed: Feb. 24, 2003

(65) Prior Publication Data

US 2004/0164851 A1 Aug. 26, 2004

(51) Int. Cl.[7] ............................................. B60Q 1/00
(52) U.S. Cl. ....................... 340/435; 340/903; 348/148; 701/301
(58) Field of Search ............................ 340/435, 903, 340/901, 905, 904, 937; 348/148, 149; 701/1, 28, 41, 301; 382/104, 286, 291

(56) References Cited

U.S. PATENT DOCUMENTS

| | | | |
|---|---|---|---|
| 5,351,044 A | 9/1994 | Mathur et al. | 340/901 |
| 5,521,579 A | 5/1996 | Bernhard | 340/438 |
| 5,689,249 A | 11/1997 | Sakamoto et al. | 340/901 |
| 5,835,028 A | 11/1998 | Bender et al. | 340/937 |
| 5,949,331 A | 9/1999 | Schofield et al. | 340/461 |
| 6,133,824 A | 10/2000 | Lee et al. | 340/435 |
| 6,133,825 A | 10/2000 | Matsuoka | 340/436 |
| 6,138,062 A | 10/2000 | Usami | 701/23 |
| 6,151,539 A * | 11/2000 | Bergholz et al. | 701/25 |
| 6,170,955 B1 | 1/2001 | Campbell et al. | 359/509 |
| 6,172,600 B1 | 1/2001 | Kakinami et al. | 340/435 |
| 6,215,392 B1 | 4/2001 | Okada | 340/436 |
| 6,226,592 B1 | 5/2001 | Luckscheiter et al. | 701/301 |
| 6,259,359 B1 | 7/2001 | Fujinami et al. | 340/435 |
| 6,292,111 B1 | 9/2001 | Ishikawa et al. | 340/937 |
| 6,360,170 B1 | 3/2002 | Ishikawa et al. | 701/300 |
| 6,369,701 B1 | 4/2002 | Yoshida et al. | 340/435 |
| 6,593,960 B1 * | 7/2003 | Sugimoto et al. | 348/148 |
| 6,618,672 B2 * | 9/2003 | Sasaki et al. | 701/301 |
| 6,737,963 B2 * | 5/2004 | Gutta et al. | 340/435 |
| 6,759,949 B2 * | 7/2004 | Miyahara | 340/435 |
| 6,765,480 B2 * | 7/2004 | Tseng | 340/425.5 |

* cited by examiner

Primary Examiner—Brent A. Swarthout
(74) Attorney, Agent, or Firm—Myers Dawes Andras & Sherman LLP (57) ABSTRACT

A lane tracking system for a vehicle employing redundant imaging devices with different fields of view is disclosed. The imaging devices are oriented in generally opposite directions so glare or other harsh lighting hampering one imaging device will not affect the other device. The appropriate image is selected based on image quality and used to detect lane markers and vehicle position. A preferred application for lane departure warning is also disclosed.

16 Claims, 6 Drawing Sheets

LANE TRACKING SYSTEM EMPLOYING REDUNDANT IMAGE SENSING DEVICES

BACKGROUND OF THE INVENTION

1. Field of the Invention

The present invention relates to lane tracking systems for vehicle positioning and safety applications and more generally relates to imaging systems and methods for vehicle positioning and safety applications.

2. Description of the Prior Art and Related Information

The capabilities of modern image processing systems have provided an opportunity for improving vehicle occupant safety and vehicle guidance. In particular, lane tracking systems have been proposed which can monitor the vehicle position by imaging a roadway and detecting lane markers. Such lane tracking systems can be used to warn the driver when the vehicle is about to leave a lane, or in more advanced systems may even be used for automated vehicle guidance systems. In such lane tracking systems, the camera records images of the roadway in front of the vehicle and imaging processing software isolates the lane markers from the roadway. The vehicle position is then determined relative to the lane markers by additional processing software.

For such lane tracking systems to be effective for vehicle occupant safety, vehicle guidance or other applications it is important that the lane tracking be effective under most if not all conditions which will be encountered in real world applications. However, this is very difficult in practice. For example, a variety of difficult lighting conditions may commonly occur which make it much more difficult for the imaging system to accurately determine lane markers and vehicle position. One such example of a common difficult imaging condition is bright sunlight where glare off the roadway can saturate the image so the roadway lane markers cannot be accurately detected. Another example is nighttime driving where oncoming headlights can saturate the imaging system making it impossible to detect lane markers illuminated by the vehicle headlights. Since these are very common situations which can continue for hours at a time, if these situations cannot be adequately dealt with the usefulness of a lane tracking system in a vehicle is substantially diminished.

Prior approaches to this problem of poor lane imaging under harsh lighting conditions have tried to increase the sophistication of the imaging devices, i.e., use more sophisticated cameras, or use more sophisticated image processing algorithms to increase the ability of the imaging system to detect the lane markers despite the poor image quality. Such approaches to solving the problem may become extremely complex and costly, both to design and to implement due to the cost of the imaging hardware and the more powerful image processors required. Also, despite such added cost and complexity the image itself cannot be controlled and such a brute force approach may not be successful in all of the lighting conditions which will be experienced in real world applications. Also, the cost constraints of the particular application may make very complex and costly solutions impractical whereas lower cost hardware and software systems cannot adequately deal with the problem.

Accordingly, a need presently exists for a system and method for detecting lane markers in a roadway for vehicle occupant safety and other applications which can provide accurate lane marker detection under a variety of difficult lighting conditions.

SUMMARY

In a first aspect the present invention provides a lane tracking system employing redundant image sensing devices adapted for use with a vehicle. The lane tracking system comprises a first imaging device configured on the vehicle with an orientation and field of view so as to image a portion of the roadway in front of the vehicle and a second imaging device configured on the vehicle with an orientation and field of view so as to image a portion of the roadway to the rear of the vehicle. The lane tracking system also comprises a memory storing first and second image data from the first and second imaging devices and a processor coupled to receive the first and second image data from the memory. The processor performs image processing of the redundant image data to determine vehicle position. The processor may, for example, receive the image data and perform the processing on a frame by frame basis. Specifically, the processor performs image processing to determine if the image quality of the first image data is at a desired level and detects roadway lane markers and determines vehicle position using the first image data if the first image data is at or above the desired level. The processor performs image processing to determine if the image quality of the second image data is at the desired level and detects roadway lane markers and determines vehicle position using the second image data if the first image data is below the desired level and the second image data is at or above the desired level.

The processor may perform additional comparison processing of the first and second image data if the image quality of both the first and second image data is below the desired level. The additional comparison processing may comprise comparing the vehicle position based on the first and second image data to determine if they are the same within an acceptable margin of error. The additional comparison processing may further comprise normalizing the vehicle positions prior to comparing the vehicle positions. For example, the processing to normalize the vehicle positions may comprise adjusting the vehicle position due to different position and orientation of the first and second imaging devices. The processing to normalize the vehicle positions may also comprise adjusting the vehicle position due to motion of the vehicle. The additional comparison processing may also comprise performing a weighting of the vehicle positions based on the first and second image data and signal quality of the first and second image data to determine if a vehicle position may be confirmed.

In one preferred embodiment of the lane tracking system the processor may comprise a DSP and the first and second imaging devices may comprise CMOS imagers. The processor may determine if the image quality of the first and second image data is at the desired level by comparing the image contrast and signal strength of the image data to desired values.

In another aspect the present invention provides a lane departure warning system adapted for use with a vehicle. The lane departure warning system comprises a first imaging device configured on the vehicle with an orientation and field of view so as to image a portion of the roadway in front of the vehicle and a second imaging device configured on the vehicle with an orientation and field of view so as to image a portion of the roadway to the rear of the vehicle. A memory is provided for storing first and second image data from the first and second imaging devices. The lane departure warning system further comprises means for receiving the first and second image data from the memory and determining vehicle distance from a lane boundary using either the first or second image data based on the signal quality of the first image data and the second image data. The lane departure warning system further comprises means for comparing the vehicle distance from the lane boundary, determined using the first or second image data, to a minimum value and issuing a warning signal if the vehicle distance from the lane boundary falls below a minimum value and a warning device providing a warning to the vehicle operator in response to the warning signal. The warning device may comprise a display or a sound generator.

In another aspect the present invention comprises a method for detecting vehicle position relative to roadway lane markers. The method comprises acquiring first image data from a first field of view including a first portion of the roadway, and acquiring second image data from a second field of view oriented generally opposite to the first field of view and including a second portion of the roadway. As one example, the first field of view may be oriented toward the front of the vehicle and the second field of view may be oriented toward the rear of the vehicle. The method further comprises determining image quality of the first and second image data. For example, the image quality of the first and second image data may be determined using signal strength and contrast of the first and second image data. The method further comprises detecting lane markers and determining vehicle position relative to the lane markers using the first image data or the second image data, based on the quality of the image data. The method may further comprise detecting if the vehicle distance falls within a minimum distance from a lane boundary and issuing a lane departure warning in response to such detection.

Further aspects of the present invention will be appreciated from the following detailed description of the invention.

DETAILED DESCRIPTION OF THE INVENTION

Figure 1:
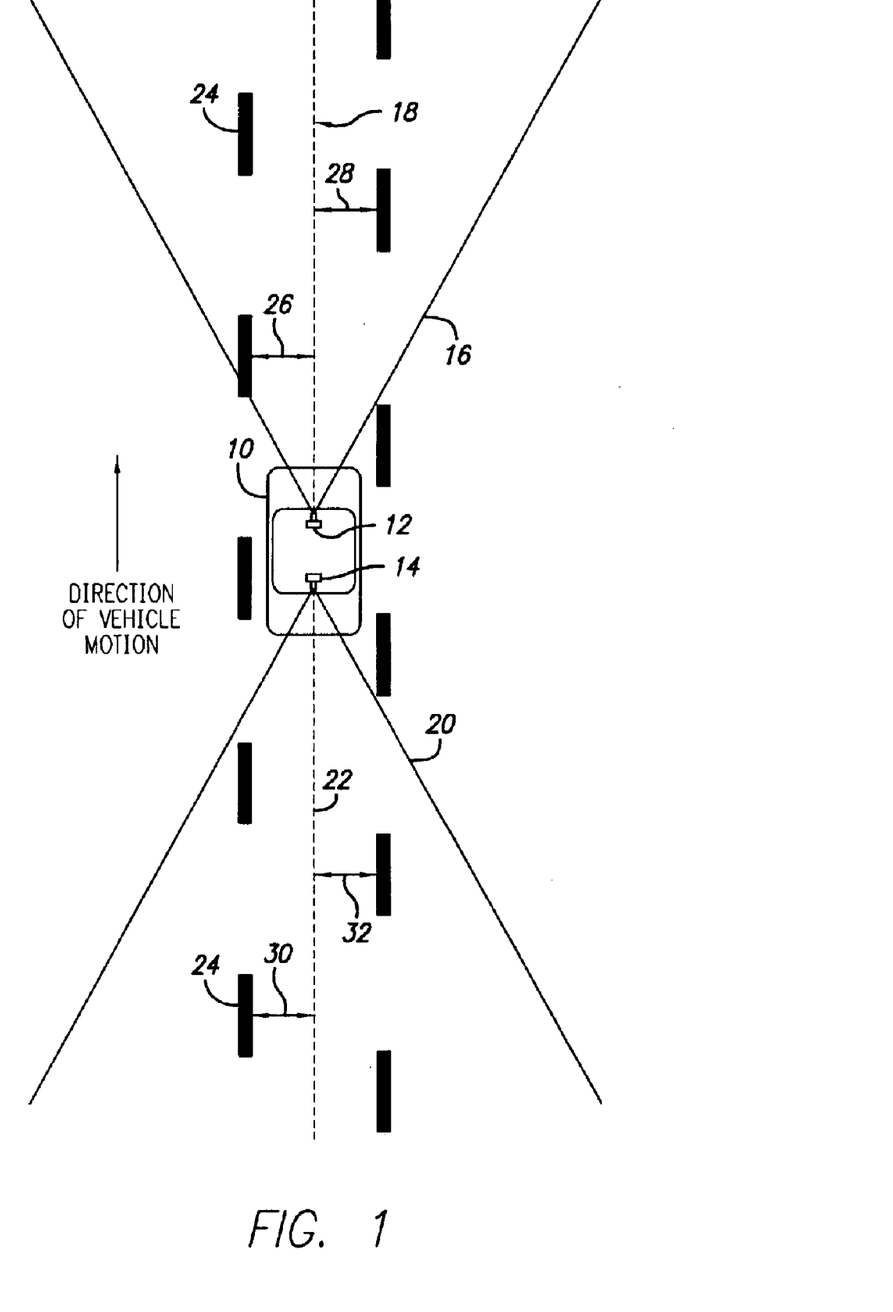
FIG. 1 is a schematic drawing of a vehicle employing the lane detection system of the present invention.

Referring first to FIG. 1, a schematic drawing of a vehicle 10 employing the lane detection system of the present invention is illustrated. The lane detection system of the present invention employs redundant imaging devices or cameras, with two cameras 12 and 14 being illustrated in FIG. 1. Additional cameras may also be employed, however. The two cameras 12 and 14 are oriented generally along the direction of vehicle travel and away from the direction of travel, respectively. As a result, camera 12 has a field of view 16 oriented forward along the roadway and with an optical axis 18. Camera 14 in turn has a field of view 20 oriented rearward along the roadway with an optical axis 22. The camera angle, orientation and field of view are chosen so that both cameras image a portion of the roadway including lane markers 24. As will be discussed in more detail below, this provides two independent determinations of vehicle position determined by the optical axis 18 and the optical axis 22 relative to the lane markers 24. This redundancy in the determination of vehicle position using two oppositely oriented fields of view of the roadway can provide significant advantages where one of the images is degraded due to glare caused by bright sunlight, oncoming headlights or other uneven external lighting. In this case, the generally opposed orientation of the two cameras prevents the light source causing the lighting problem from affecting both cameras.

The optical axis 18 of the camera 12 and the optical axis 22 of the camera 14 are shown as aligned but 180 degrees opposed, or anti-parallel in FIG. 1, and this may have advantages for comparing the images of the roadway from the two cameras. For example, the relative offsets of the lane markers from the optical axis, generally indicated in FIG. 1 as offsets 26 and 28 for the forward looking camera and offsets 30 and 32 for the rearward looking camera, will correspond in the case of aligned forward and rearward looking optical axes making vehicle position comparisons somewhat easier. However, the two cameras may be oriented with different optical axis orientations; for example, the two cameras may be diagonally oriented or angled and/or may be offset laterally, e.g., positioned on diagonally opposed portions of the vehicle 10. Also, the illustrated configuration of two cameras as mounted in front and back of the passenger compartment of the vehicle is only one example of a mounting configuration and alternative mounting configurations may be provided. For example, it may be advantageous to mount one, two or more of the cameras to external rear view mirrors of the vehicle. One such embodiment may include one forward looking camera imaging both left and right lane markers in front of the vehicle and two rearward looking cameras mounted to left and right external side rear view mirrors imaging left and right lane markers, respectively. Various mounting systems for mounting cameras to the vehicle may be provided and may be customized for the particular vehicle. One mounting system which may be employed for mounting cameras inside the windows of the passenger compartment of the vehicle is disclosed in U.S. Pat. No. 6,170,955 issued Jan. 9, 2001, the disclosure of which is incorporated herein by reference in its entirety. An alternative mounting system for use on a vehicle windshield is disclosed in U.S. Pat. No. 6,392,218 issued May 21, 2002, the disclosure of which is also incorporated herein by reference in its entirety.

Figure 2:
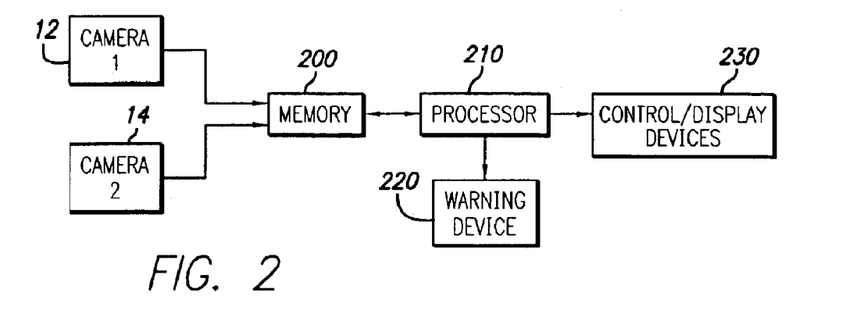
FIG. 2 is a block schematic drawing of the lane detection system of the present invention.

Referring to FIG. 2, a block schematic drawing of the lane tracking system in accordance with a preferred embodiment of the present invention is illustrated. The cameras 12 and 14 may comprise known imaging devices such as CCD or CMOS imaging devices. For example, CMOS imaging devices are commercially available from a number of sources and may be preferred imaging devices used for cameras 12 and 14 due to their relatively low cost and the quality of their performance. Image data captured by cameras 12 and 14 is provided on a frame by frame basis to a memory 200. Memory 200 may be a RAM which is accessed by processor 210 and which is large enough to store image data if image data is alternated on a frame by frame basis from cameras 12 and 14. A larger memory may also be employed so as to simultaneously hold one or more frames of image data from both cameras. Alternatively, memory 200 may comprise separate RAMs provided for each camera which separate memories are individually accessible by processor 210. Such separate memories need not be configured at the same location and may, for example, be situated on separate circuit boards on which the camera hardware is mounted with wiring connecting the processor to both camera locations. Memory 200 may also receive and store additional information from cameras 12 and 14, such as image signal strength, contrast and any adjustable camera settings. Also, the processor 210 may store information in memory 200, such as frame by frame vehicle position, for use in multiple frame evaluations, such as in determining vehicle velocity by analyzing vehicle position over multiple frames of image data. The processor 210 may be a suitably programmed DSP which implements an image processing algorithm, one specific embodiment of which is described in detail below in relation to FIGS. 3A–3D, to determine which set of image data to be employed for lane detection and to determine vehicle position based on the quality of the image data. The processor 210 may provide conventional image preconditioning, such as brightness control, contrast enhancement, edge detection, etc., prior to the implementation of the algorithm described in more detail below in relation to FIGS. 3A–3D. Alternatively, a separate digital signal processor may be employed to precondition the image data and/or to determine a region of interest in the image data and to provide initial image processing to isolate the lane markers in the region of interest. Further specifics on the manner in which the image data may be processed for isolation of a region of interest and lane marker detection is described in U.S. patent application Ser. No. 09/121,800 filed Jul. 23, 1998 for an Imaging System And Method With Dynamic Brightness Control, the disclosure of which is incorporated herein by reference in its entirety.

As further illustrated in FIG. 2, the processor 210 employs the vehicle position determined using the redundant camera image data to implement particular safety or guidance functions of the particular implementation of the lane tracking system. In particular, in a lane departure warning system processor 210 will use the vehicle position information to appropriately activate warning device 220 if the vehicle position is determined to come too close to the lane markers defining the vehicle lane roadway. The processor 210 may in addition, or in another implementation, use the vehicle position information to activate other devices illustrated generally at 230 in FIG. 2. For example, device 230 may be a display in which case processor 210 illustrates the vehicle position on display device 230. Alternatively, device 230 may encompass a more complex vehicle guidance system and the vehicle position information may be employed to suitably control the vehicle.

Referring to FIGS. 3A–3D a lane tracking process flow implemented by processor 210 employing redundant image data in accordance with a preferred embodiment of the present invention is illustrated.

Figure 3A:
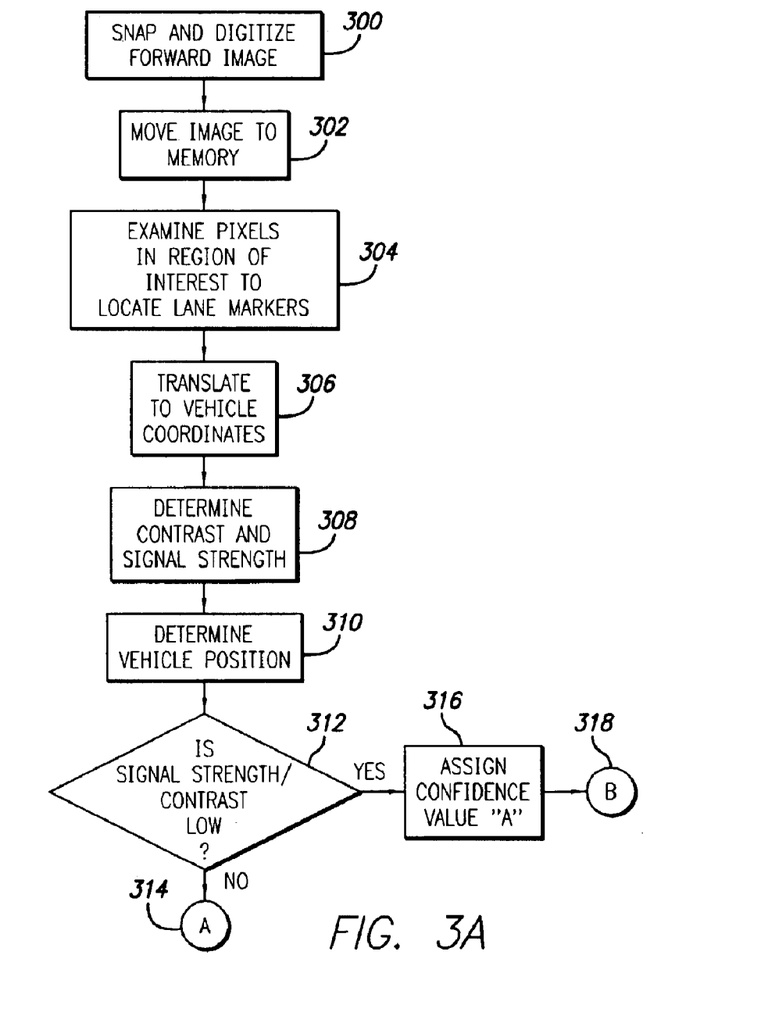
FIG. 3A-3D are flow diagrams of a lane detection processing in accordance with the present invention.

First at 300 a first frame of image data is captured from forward looking camera 12 and the image data is moved into memory 200 at 302. At 304, processor 210 accesses the frame of image data stored in memory 200 and examines the pixels in the region of interest corresponding to the roadway having lane markers 24 (referring to FIG. 1). A conventional image processing may be employed to isolate the lane markers in the region of interest. Alternatively, the lane marker detection may be performed by image processing circuitry prior to image processing by processor 210, for example in a suitably programmed DSP or in specialized circuitry optimized for lane detection. For example, one relatively simple system for detection of lane markers in a roadway image is described in U.S. Pat. No. 5,351,044 issued Sep. 27, 1994, the disclosure of which is incorporated herein by reference in its entirety.

After the lane markers are located in the image the lane marker position is translated to vehicle coordinates at 306. As noted about in relation to FIG. 1 this determination will depend on the location of the optical axis and the positioning of the camera in the vehicle. Also, this determination may involve one set of lane markers or both left and right lane markers shown in FIG. 1 depending on the field of view of the camera and the specific roadway being imaged. A measure of the quality of the image data is made at 308, for example, the contrast and signal strength may be determined. This determination may use information provided from camera 12 along with the image data or may be implemented by processor 210 by evaluating pixel quality in the frame of image data or may use a combination of camera information and additional image processing by processor 210. At 310 the lane marker position information determined at 306 and generally corresponding to a plurality of lane markers, is employed to determine the vehicle position relative to the roadway boundary defined by the lane markers. The vehicle position may be referenced to a left lane boundary or a right lane boundary or both depending on the field of view and the roadway. Next, at 312 a determination is made whether the signal quality is sufficiently good for the determination of vehicle position to be deemed reliable. For example, the signal quality determined at 308 for the image data may be compared to reference information corresponding to the desired signal strength and contrast for a confirmation of valid vehicle position detection. This reference may be adjustable to accommodate different applications; for example, a higher level may be used if a vehicle control function is engaged and a lower level if only a lane departure warning is engaged. Also, different reference levels may be used for daytime and nighttime conditions. If the signal quality determination at 312 is that the signal quality is acceptable then the process flow proceeds to 314, corresponding to appropriate action based on the confirmed vehicle position as described in relation to FIG. 3B. On the other hand, if the determination at 312 is that the signal quality is not sufficiently good to immediately confirm vehicle position then the process flow proceeds to assign a confidence value to the vehicle position determination made from the forward looking camera at 316. In addition to using the signal quality for the frame of image data being processed this determination of a confidence value may also use immediately prior frame or frames' position values. Also, this determination of a confidence value may also use vehicle velocity information, if available. The result of this determination 316 is to allocate a confidence value "A" for the forward looking camera. Then the process flow proceeds at 318 to image processing using the second camera as described below in relation to FIG. 3C.

Figure 3B:
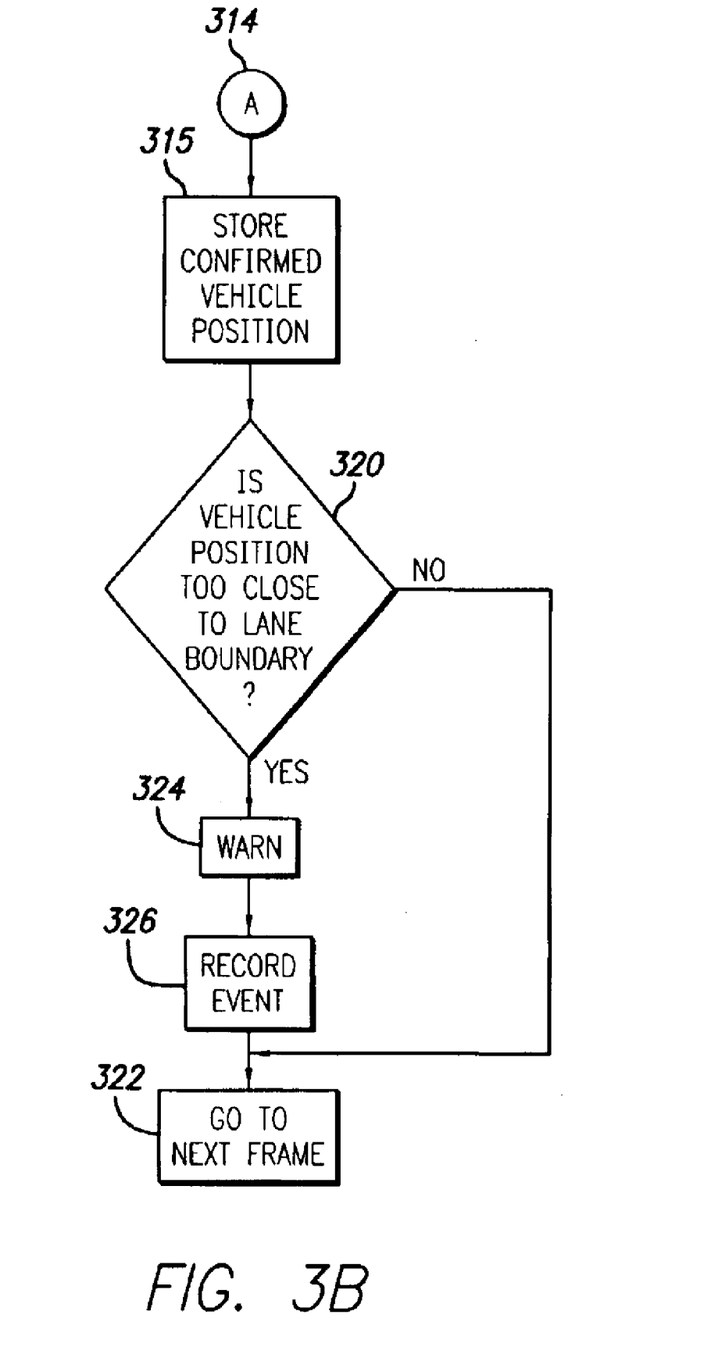

Next, referring to FIG. 3B the processing after a confirmed vehicle position determination is made at 314 is illustrated. First at 315 the confirmed vehicle position is stored, for example using a portion of the memory 200 or using a separate memory, for use in the specific frame processing and for subsequent averaging and velocity determinations involving confirmed positions from plural frames. Next the confirmed position is employed for the specific application. As discussed above, one preferred embodiment of the lane tracking system is in a lane departure warning application. Accordingly, after a confirmed vehicle position determination the process flow may proceed to initiate a lane departure warning process flow. In particular, at 320 a determination is made whether or not the vehicle position is too close to the lane boundary. This determination may use the vehicle position information from the current frame only or may use a combination or average of values from several frames before making a decision. This determination may also use the vehicle velocity information relative to the lane boundary by looking at confirmed position information from several prior frames to determine a time to lane crossing. If the determination at 320 is made that the vehicle position and/or time to crossing is acceptable the process flow continues to 322 where analysis is made of the next frame in the image data memory. If the determination at 320 is that the vehicle position is unacceptably close to the lane boundary then the processor flow proceeds to warn the vehicle operator at 324 using the warning device 220 described above in relation to FIG. 2. For example this may be an audible warning, a visual warning such as a flashing light, or a combination of audible and visual warnings. Next at 326 the processor flow proceeds to record the event, for example using a portion of the memory 200 or using a separate memory. The process flow then proceeds to the next frame at 322 and proceeds as described above in relation to FIG. 3A.

Figure 3C:
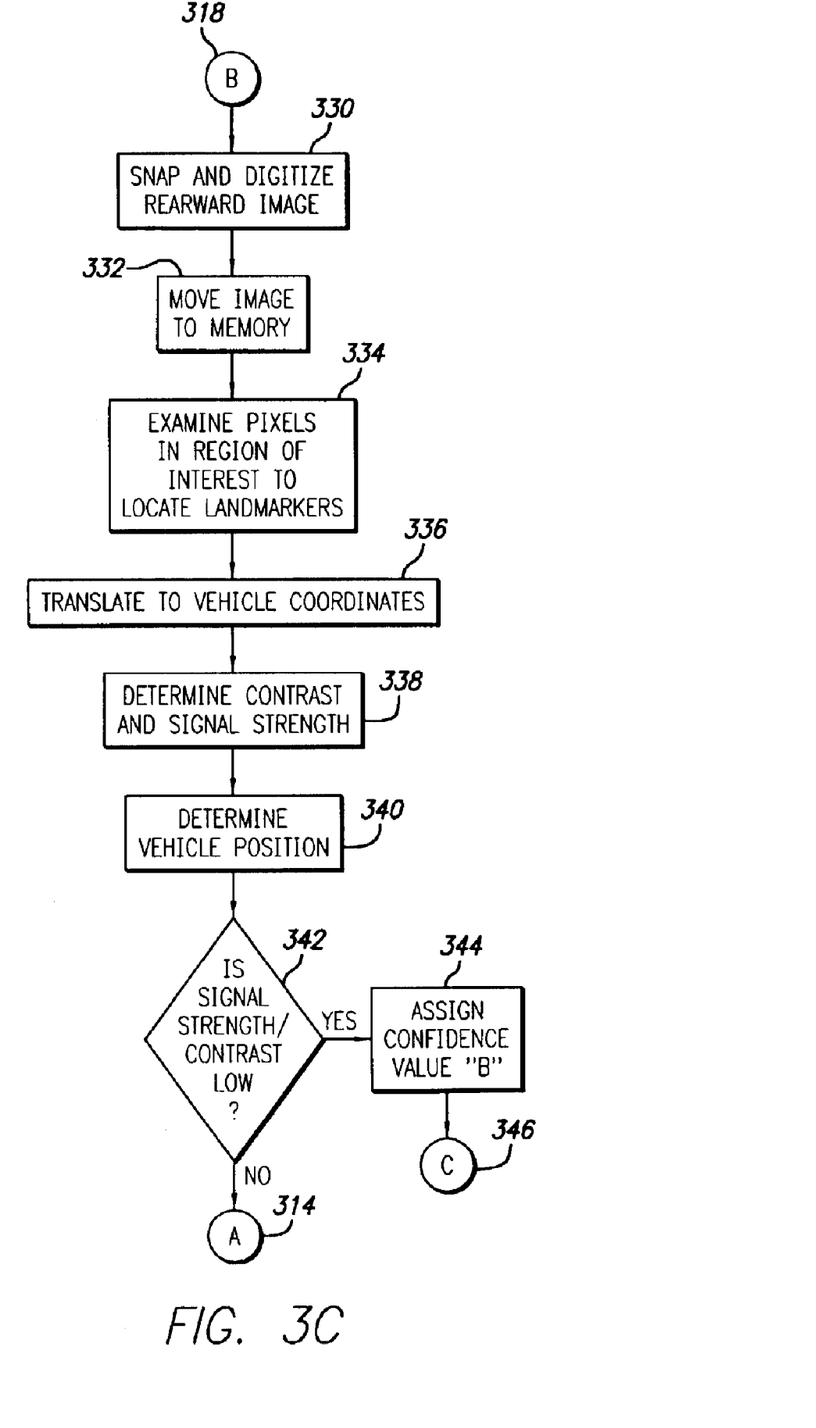

Referring to FIG. 3C the process flow is illustrated when the determination at 318 is made that the vehicle position determined from image data from the forward looking camera is potentially unreliable. As shown, the process flow proceeds to analyze the image data from the rearward looking camera by first capturing the image data from the rearward looking camera at 330 and moving the captured image data to the memory 200 at 332. Next, the process flow for the second camera proceeds at 334 to examine pixels in the region of interest corresponding to the rearward oriented roadway view. As in the previously described process flow at 304 the region of interest is examined to locate the lane markers using conventional processing techniques. Once the lane markers have been located the position of the lane markers is translated to vehicle coordinates at 336 in a similar manner as described in the previous process flow for the forward looking camera. At 338 the signal quality for the rearward looking camera is determined, for example by determining the contrast and signal strength of the image data. As in the case of the forward looking camera, this determination may use information provided from camera 14 or may be implemented by processor 210 by evaluating pixel quality in the frame of image data or may use a combination of camera information and additional image processing by processor 210. At 340 the process flow continues to determine the vehicle position based on the lane marker data determined at 336. At 342 a determination is made whether or not the quality of the image data from the rearward looking camera is sufficient to confirm vehicle position. In particular, at 342 it is determined whether not the signal quality is inadequate to provide a confirmed vehicle position detection. If the determination at 342 is that the signal quality, e.g., signal strength and contrast, is adequate then the process flow proceeds at 314 to implement a confirmed vehicle position processing based upon the vehicle position determination made at 340. This process flow beginning at 314 is as described above in relation to FIG. 3B and the rearward looking camera determination of vehicle position is employed to the exclusion of the position information from the forward looking camera.

If the determination at 342 is that the signal quality is too low to provide the desired confirmation of vehicle position the process flow proceeds at 344 to assign a confidence value "B" to the vehicle position determination made based on the rearward looking camera image data. As in the case of the confidence value determination for the forward looking camera, the confidence value determination at 344 analyzes the signal quality of the current frame of image data from the rearward looking camera, and may include additional information such as stored position information from a prior frame or frames and/or vehicle velocity information. The process flow then proceeds at 346 to continue to attempt to determine vehicle position. Alternatively, if additional cameras are provided the process flow may proceed to process the data from the additional cameras in the same manner as described in relation to the rearward looking camera to attempt to confirm vehicle position.

Figure 3D:
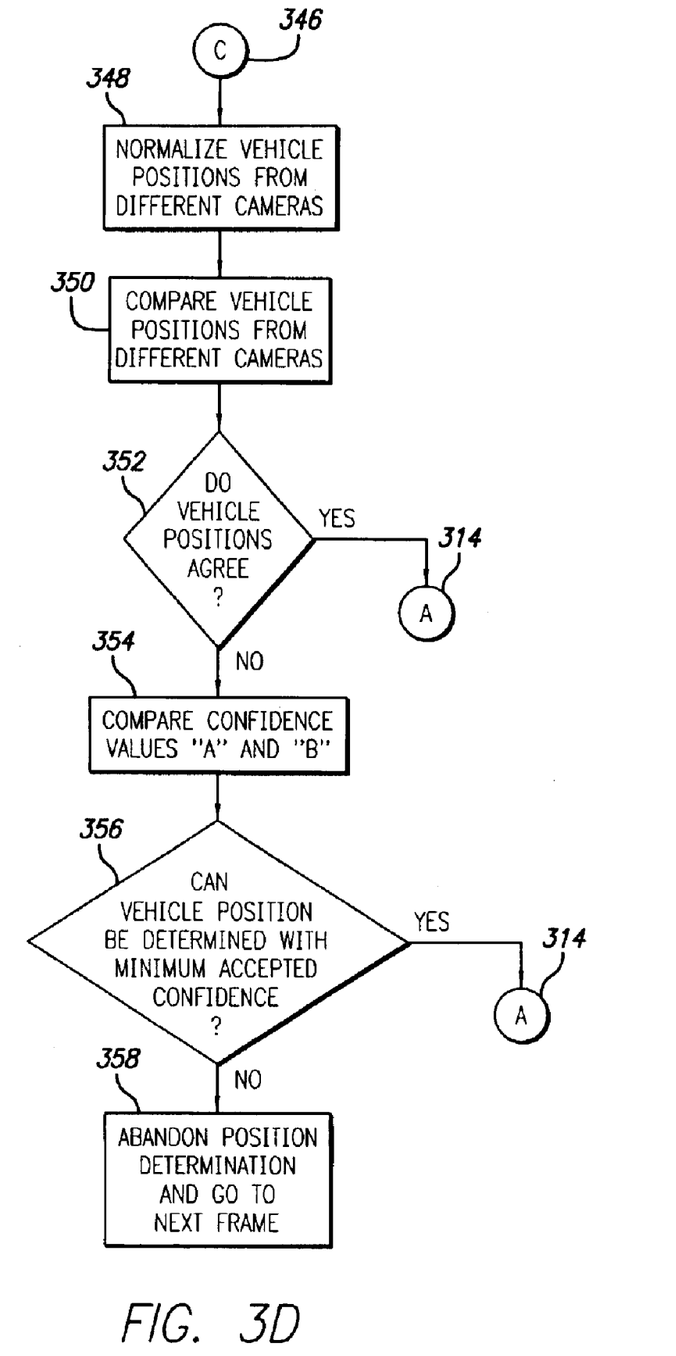

Referring to FIG. 3D the process flow is illustrated following a determination at 346 that neither the forward nor rearward looking camera has a confirmed vehicle position. At 348 the vehicle position determinations from the two cameras are first normalized to take into account the different views that are imaged by the two cameras. More specifically, the view of the roadway imaged by the forward looking camera is from a different orientation and corresponds to a different segment of roadway than that imaged from the rearward looking camera. Therefore, the two vehicle position determinations must be normalized to a consistent coordinate system. For example, one of the two cameras may be making a vehicle position determination based upon lane markers on the left side of the roadway, due to a better quality image of those lane markers or due to the orientation of the camera, while the second camera is imaging lane markers on the right side of roadway. Therefore, to make a consistent comparison of vehicle positions these two positions must be first referenced to a common lane boundary such as the left, right or lane center. Also, if the forward and rearward looking images are not captured at the same instant of time the vehicle motion may cause the vehicle position relative to the lane boundary to change slightly between the two images. This difference may also be adjusted by the normalization at 348 using vehicle velocity information derived from several frames of image data.

Next at 350 the vehicle position from the different cameras are compared using the normalized vehicle positions. Then at 352 a determination is made whether or not the vehicle position is in agreement within an acceptable margin of error. For example, the vehicle comparison made at 350 may be evaluated at 352 relative to a stored acceptable margin of error corresponding to agreement between the two vehicle positions within an acceptable measurement error. If the determination at 352 is that the vehicle positions agree to within an acceptable margin of error, the process flow proceeds to 314, described above in relation to FIG. 3B, to perform a confirmed position processing based on the matching vehicle position if the two cameras match exactly or an average of the positions if they differ.

If the determination at 352 is that the vehicle positions do not agree from the two cameras within the acceptable margin of error, processing proceeds at 354 to continue to attempt to determine vehicle position. In particular, at 354 the two confidence values "A" and "B" are compared to attempt to determine if one or the other position determinations should be accepted as correct. For example, this determination may be derived by weighting the two confidence values "A" and "B" with an appropriate mathematical weighting function. For example, the sum and ratio of confidence values "A" and "B" may be compared to reference values to confirm one of the two position measurements. Alternatively, a variety of other mathematical weighting functions may be applied in order to decide if an acceptable level of confidence in a position can be confirmed at 356. Also, this determination may involve an adjustable input such as warning or vehicle control mode of operation or daytime and nighttime driving, to adjust the acceptable level of confidence to match the specific situation. If the determination is that the vehicle position can be determined with a minimum accepted confidence level the process flow proceeds to 314 to perform the confirmed position processing described previously.

Alternatively, if the determination at 356 is that the vehicle position cannot be determined with a minimum accepted confidence level the process flow proceeds at 348 to abandon the position determination based on the currently available image data and proceed to the next frame of image data and commence the process flow described in relation to FIG. 3A.

The process flow described above in relation to FIGS. 3A–3D may be varied in a variety of ways and in many aspects and is not rigidly set out by the specific series of processing stages described. For example, although the processing is illustrated sequentially with respect to the processing of the image data from forward looking camera 12 and the processing of the image data from rearward looking camera 14, some or all of this processing may be performed in parallel. Whether or not various actions occur simultaneously or not may depend upon the size of the image data memory, and whether or not simultaneous storage of plural frames of image data can be accommodated in the image data memory, as well as processor speed. In the case of parallel processing, if both camera position determinations are confirmed the process flow may proceed as in FIG. 3D to average or weight the two positions to account for any differences. As another alternative process flow, rearward camera processing may proceed first or the order may be selected based on operating conditions, such as daytime/nighttime. Other variations in the sequence of processing and/or combining or elimination of some stages will also be within the modifications apparent to those skilled in the art.

Figures 4A, 4B, 4C:
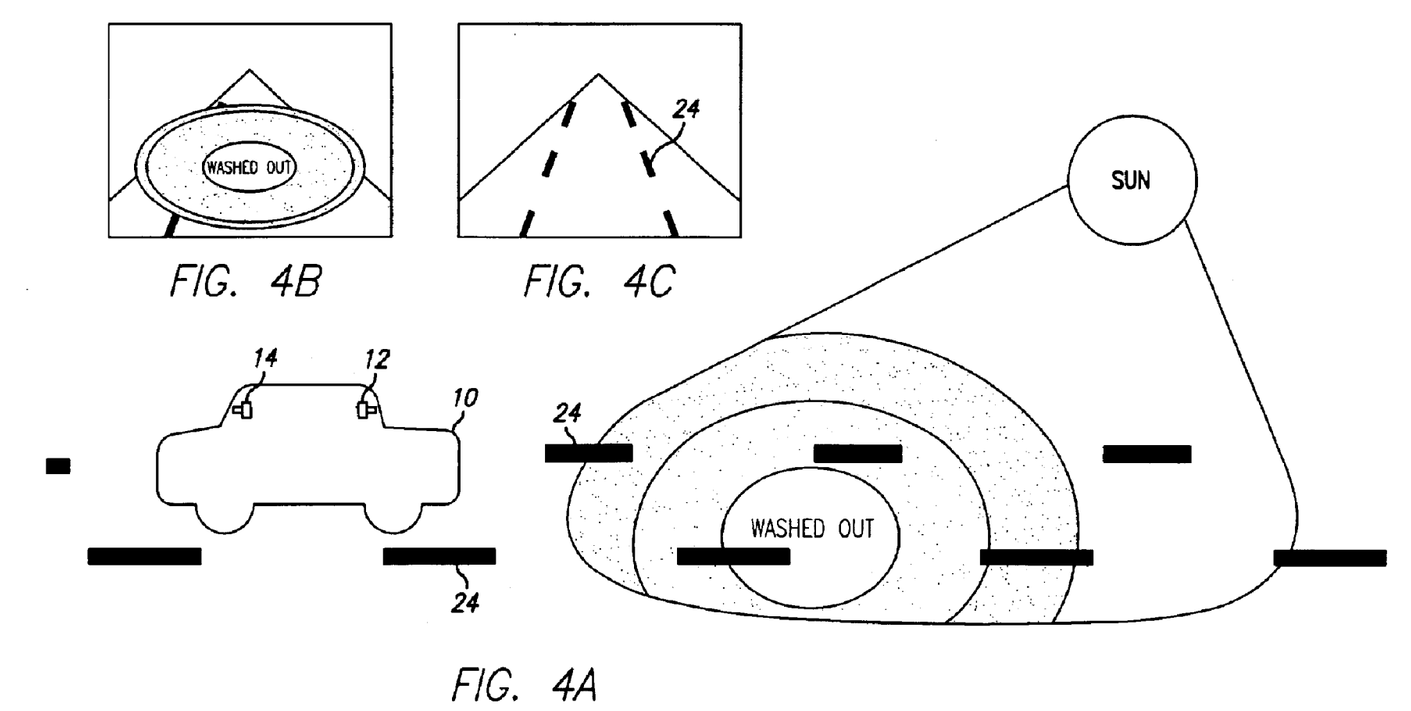
FIGS. 4A-4C are schematic drawings of a vehicle and roadway images illustrating the operation of the present invention in a bright daylight environment.

Next to provide a specific example of the operation of the lane tracking system of the present invention, and to better illustrate the advantages of the present invention, one specific example of an ambient lighting situation is illustrated in FIGS. 4A–4C. First, in FIG. 4A a vehicle 10 equipped with the lane tracking system of the present invention is illustrated in a lighting situation where very bright sunlight is reflected off the roadway in front of the vehicle. The view from the front facing camera 12 is illustrated in FIG. 4B and the view from the rearward facing camera 14 is illustrated in FIG. 4C. As is apparent from inspection of FIG. 4B, the view from the front facing camera 12 is unacceptably degraded due to be very bright sunlight reflecting off the roadway. As a consequence a lane detection system relying solely on the forward facing camera would be unusable the entire time of travel into the sunlight illustrated in FIG. 4A. Clearly such a lighting condition could last for many hours in a real-life situation and as a result a conventional lane detection system would be effectively disabled for hours at a time significantly reducing the effectiveness of the system for many applications.

Referring to FIG. 4C, it is apparent that in the same lighting conditions the rearward facing camera has a clear and well imaged view of the roadway including lane markers 24. As result, the operation of the redundant lane detection system of the present invention proceeds from the forward camera process flow of FIG. 3A to the rearward facing camera process flow described above in relation to FIG. 3C. The result of this process flow provides a confirmed accurate vehicle position determination using the good quality image data from the rearward facing camera. Appropriate processing using the position information, such as lane departure detection processing and warning, may be provided despite the difficult lighting condition. Similar advantageous results will be provided with other typical lighting conditions such as lights from oncoming traffic which may periodically blind a front looking camera.

Accordingly, as described above the present invention provides a lane tracking system having a number of advantages and features over prior approaches. Although a preferred embodiment of the invention has been described it should be appreciated that many variations are possible, too numerous to describe in detail, which equally embody the present invention. For example, although a specific embodiment employing two cameras has been described, embodiments with three, four or more cameras may provide additional redundancy and may equally employ the teachings of the present invention. Also, the specific process flow described is but one example and may be varied in a number of ways as will be apparent to those skilled in the art. Also, a variety of different algorithms may be employed in various stages of the process flow, for example, in assigning confidence values, in comparing confidence values and positions from the different cameras and in deciding whether vehicle position may be confirmed, all within the teachings of the present invention. Further variations and embodiments will be appreciated by those skilled in the art and equally fall within the scope of the present invention. Accordingly, the present invention should not be limited in any way to the specific embodiment described but rather is set out in the following claims.

What is claimed is:

1. A lane tracking system adapted for use with a vehicle, comprising:

a first imaging device configured on the vehicle with an orientation and field of view so as to image a portion of the roadway in front of the vehicle;

a second imaging device configured on the vehicle with an orientation and field of view so as to image a portion of the roadway to the rear of the vehicle;

a memory storing first and second image data from the first and second imaging devices; and a processor coupled to receive the first and second image data from the memory, the processor performing image processing of the image data comprising determining if the image quality of the first image data is at a desired level, detecting roadway lane markers and determining vehicle position using the first image data if the first image data is at or above the desired level, determining if the image quality of the second image data is at the desired level, and detecting roadway lane markers and determining vehicle position using the second image data if the first image data is below the desired level and the second image data is at or above the desired level, wherein the processor determines if the image quality of the first and second image data is at the desired level by comparing the image contrast and signal strength to desired values.

2. A lane tracking system as set out in claim 1, wherein the processor receives the image data and performs said determining and detecting on a frame by frame basis.

3. A lane tracking system as set out in claim 1, wherein the processor comprises a DSP.

4. A lane tracking system as set out in claim 1, wherein the first and second imaging devices comprise CMOS imagers.

5. A lane tracking system adapted for use with a vehicle, comprising:

a first imaging device configured on the vehicle with an orientation and field of view so as to image a portion of the roadway in front of the vehicle;

a second imaging device configured on the vehicle with an orientation and field of view so as to image a portion of the roadway to the rear of the vehicle;

a memory storing first and second image data from the first and second imaging devices; and a processor coupled to receive the first and second image data from the memory, the processor performing image processing of the image data comprising determining if the image quality of the first image data is at a desired level, detecting roadway lane markers and determining vehicle position using the first image data if the first image data is at or above the desired level, determining if the image quality of the second image data is at the desired level, and detecting roadway lane markers and determining vehicle position using the second image data if the first image data is below the desired level and the second image data is at or above the desired level, and wherein the processor performs additional comparison processing of the first and second image data if the image quality of both the first and second image data is below the desired level, the additional comparison processing comprising comparing the vehicle position based on the first and second image data to determine if they are the same within an acceptable margin of error.

6. A lane tracking system as set out in claim 5, wherein the additional comparison processing further comprises normalizing the vehicle positions prior to comparing the vehicle positions.

7. A lane tracking system as set out in claim 6, wherein the processing to normalize the vehicle positions comprises adjusting the vehicle position due to different position and orientation of the first and second imaging devices.

8. A lane tracking system as set out in claim 6, wherein the processing to normalize the vehicle positions comprises adjusting the vehicle position due to motion of the vehicle.

9. A lane tracking system adapted for use with a vehicle, comprising:

a first imaging device configured on the vehicle with an orientation and field of view so as to image a portion of the roadway in front of the vehicle;

a second imaging device configured on the vehicle with an orientation and field of view so as to image a portion of the roadway to the rear of the vehicle;

a memory storing first and second image data from the first and second imaging devices; and a processor coupled to receive the first and second image data from the memory, the processor performing image processing of the image data comprising determining if the image quality of the first image data is at a desired level, detecting roadway lane markers and determining vehicle position using the first image data if the first image data is at or above the desired level, determining if the image quality of the second image data is at the desired level, and detecting roadway lane markers and determining vehicle position using the second image data if the first image data is below the desired level and the second image data is at or above the desired level, and wherein the processor performs additional comparison processing of the first and second image data if the image quality of both the first and second image data is below the desired level, the additional comparison processing comprising performing a weighting of the vehicle positions based on the first and second image data and signal quality of the first and second image data to determine if a vehicle position may be confirmed.

10. A lane tracking system as set out in claim 1, wherein the first and second imaging device have a common optical axis and an opposite orientation.

11. A lane departure warning system adapted for use with a vehicle, comprising:

a first imaging device configured on the vehicle with an orientation and field of view so as to image a portion of the roadway in front of the vehicle;

a second imaging device configured on the vehicle with an orientation and field of view so as to image a portion of the roadway to the rear of the vehicle;

a memory storing first and second image data from the first and second imaging devices;

means for receiving the first and second image data from the memory, and determining vehicle distance from a lane boundary using either the first or second image data based on the signal quality of the first image data and the second image data;

means for comparing the vehicle distance from the lane boundary, determined using the first or second image data, to a minimum value and issuing a warning signal if the vehicle distance from the lane boundary falls below a minimum value, wherein the means for comparing employs vehicle velocity information derived from the position information from plural frames of image data to determine time to lane boundary crossing and employs said time to lane boundary crossing to determine if the vehicle distance from the lane boundary falls below a minimum value; and a warning device providing a warning to the vehicle operator in response to the warning signal.

12. A lane departure warning system as set out in claim 11, wherein the warning device comprises a display.

13. A lane departure warning system as set out in claim 11, wherein the warning device comprises a sound generator.

14. A method for detecting vehicle position relative to roadway lane markers, comprising:

acquiring first image data from a first field of view including a first portion of the roadway;

acquiring second image data from a second field of view oriented generally opposite to the first field of view and including a second portion of the roadway;

determining image quality of the first and second image data by determining signal strength and contrast of the first and second image data; and detecting lane markers and determining vehicle position relative to the lane markers using the first image data or the second image data based on the quality of the image data.

15. A method for detecting vehicle position relative to roadway lane markers, as set out in claim 14, wherein the first field of view is oriented toward the front of the vehicle and the second field of view is oriented toward the rear of the vehicle.

16. A method for detecting vehicle position relative to roadway lane markers, as set out in claim 14, further comprising detecting if the vehicle distance falls within a minimum distance from a lane boundary and issuing a lane departure warning in response to such detection.

* * * * *